US011098681B2

(12) United States Patent
Sperry et al.

(10) Patent No.: US 11,098,681 B2
(45) Date of Patent: Aug. 24, 2021

(54) COBRA HEAD AIR INTAKE PORTS AND INTAKE MANIFOLDS

(71) Applicant: Cummins Inc., Columbus, IN (US)

(72) Inventors: Robert G. Sperry, Columbus, IN (US); Terry D. Partridge, Nashville, IN (US); Steven L. Leffler, Vincennes, IN (US); Kartikeya Tyagi, Indianapolis, IN (US); Amit A. Kulkarni, Columbus, IN (US); Pallav Jha, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/868,029

(22) Filed: May 6, 2020

(65) Prior Publication Data

US 2020/0263642 A1      Aug. 20, 2020

Related U.S. Application Data

(63) Continuation-in-part of application No. 16/329,410, filed as application No. PCT/US2016/049787 on Aug. 31, 2016.

(51) Int. Cl.
*F02M 35/10* (2006.01)

(52) U.S. Cl.
CPC .............................. *F02M 35/10072* (2013.01)

(58) Field of Classification Search
CPC .................... F02M 35/10118; F02M 35/10111
USPC ........................................ 123/184.21, 184.53
See application file for complete search history.

(56) References Cited

U.S. PATENT DOCUMENTS

| | | | |
|---|---|---|---|
| 4,577,602 A | 3/1986 | Showalter | |
| 4,595,319 A | 6/1986 | Cook | |
| 4,693,084 A | 9/1987 | Ahrens | |
| 4,733,889 A | 3/1988 | Haines | |
| 4,787,421 A | 11/1988 | Yu | |
| 4,829,944 A | 5/1989 | Sukimoto et al. | |
| 5,054,819 A | 10/1991 | Grunwald | |
| 5,195,488 A | 3/1993 | Rattigan | |
| 5,196,488 A | 3/1993 | Yang et al. | |
| 5,269,650 A * | 12/1993 | Benson | F01N 13/08 138/109 |
| 5,288,111 A | 2/1994 | Storf et al. | |
| 6,065,444 A * | 5/2000 | Jingu | F02B 31/085 123/301 |
| 6,848,408 B1 | 2/2005 | Mendler | |

(Continued)

FOREIGN PATENT DOCUMENTS

| | | |
|---|---|---|
| EP | 2281138 A1 | 2/2011 |
| WO | 00/32923 A1 | 6/2000 |

(Continued)

OTHER PUBLICATIONS

International Search Report and Written Opinion issued by the ISA/US, Commissioner for Patents, dated Nov. 18, 2016, for International Application No. PCT/US2016/049787; 10 pages.

*Primary Examiner* — Long T Tran
*Assistant Examiner* — James J Kim
(74) *Attorney, Agent, or Firm* — Faegre Drinker Biddle & Reath LLP

(57) ABSTRACT

The present disclosure provides air intake ports and/or intake manifolds having an altered configuration to improve the efficiency of the air intake ports, intake manifolds, and by extension, the engine.

24 Claims, 6 Drawing Sheets

(56) References Cited

U.S. PATENT DOCUMENTS

| | | | |
|---|---|---|---|
| 7,182,057 B2* | 2/2007 | Sato | F02F 1/4235 |
| | | | 123/193.5 |
| 7,300,074 B1 | 11/2007 | Paulson | |
| 8,449,250 B2* | 5/2013 | Anschel | F02M 35/10144 |
| | | | 415/206 |
| 8,516,986 B2 | 8/2013 | Silvano | |
| 8,555,637 B2 | 10/2013 | Nakae et al. | |
| 2005/0139195 A1* | 6/2005 | Kuriki | F02F 1/4235 |
| | | | 123/432 |
| 2009/0026761 A1 | 1/2009 | McMillan | |
| 2010/0229818 A1* | 9/2010 | Silvano | F02M 35/10118 |
| | | | 123/184.21 |
| 2019/0219010 A1 | 7/2019 | Sperry et al. | |
| 2020/0263642 A1 | 8/2020 | Sperry et al. | |

FOREIGN PATENT DOCUMENTS

| | | |
|---|---|---|
| WO | 2006/033602 A1 | 3/2006 |
| WO | 2009/127192 A1 | 10/2009 |

* cited by examiner

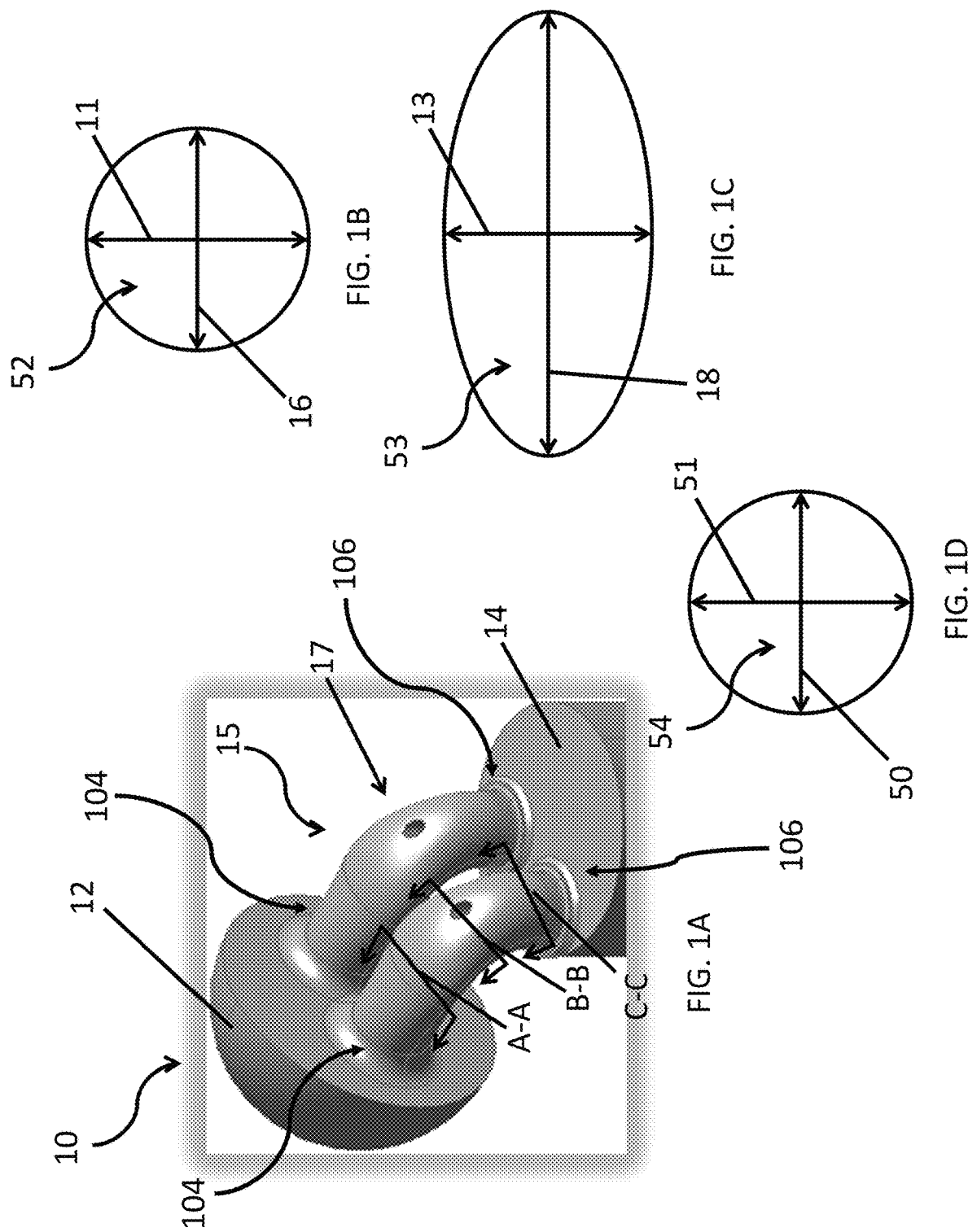

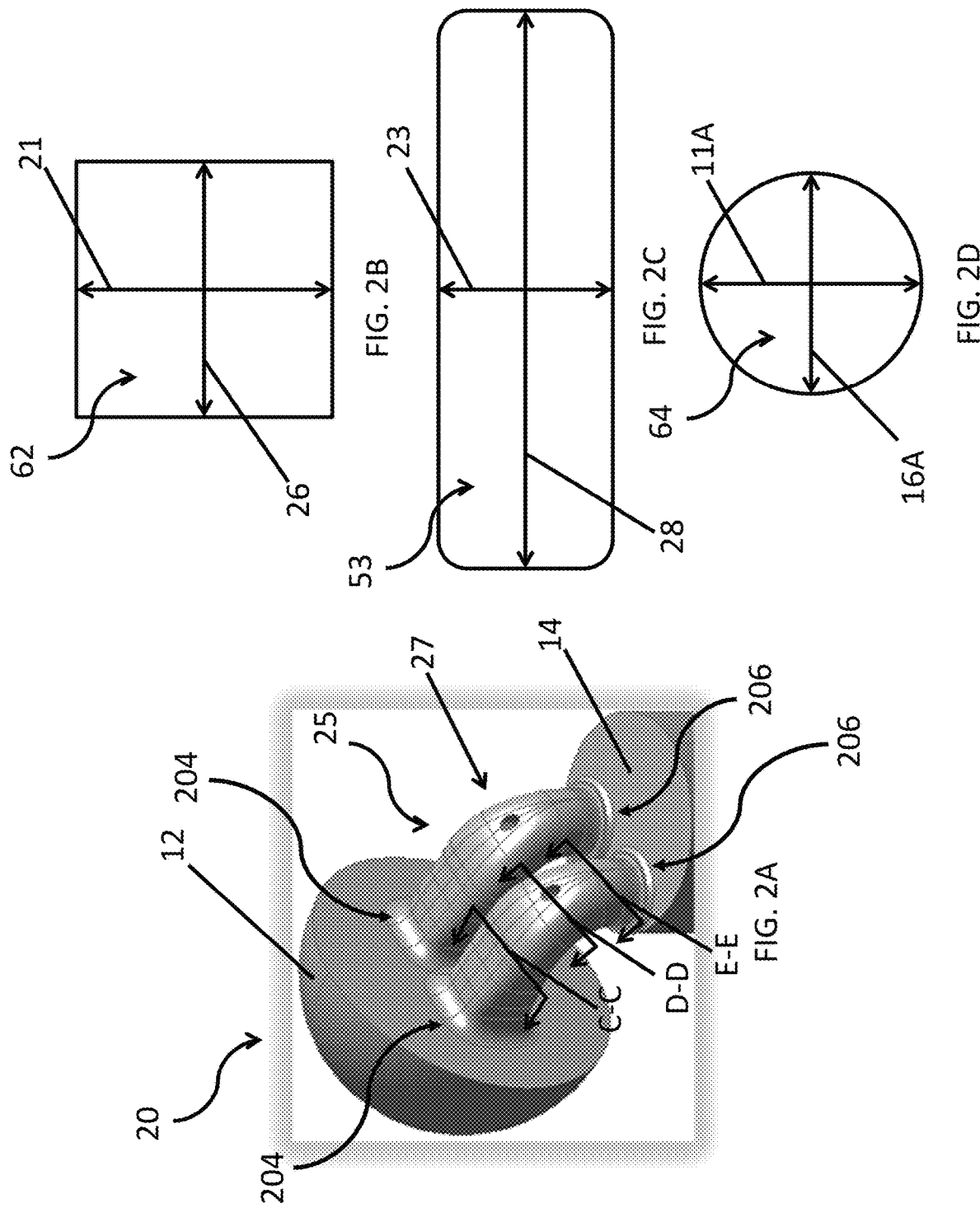

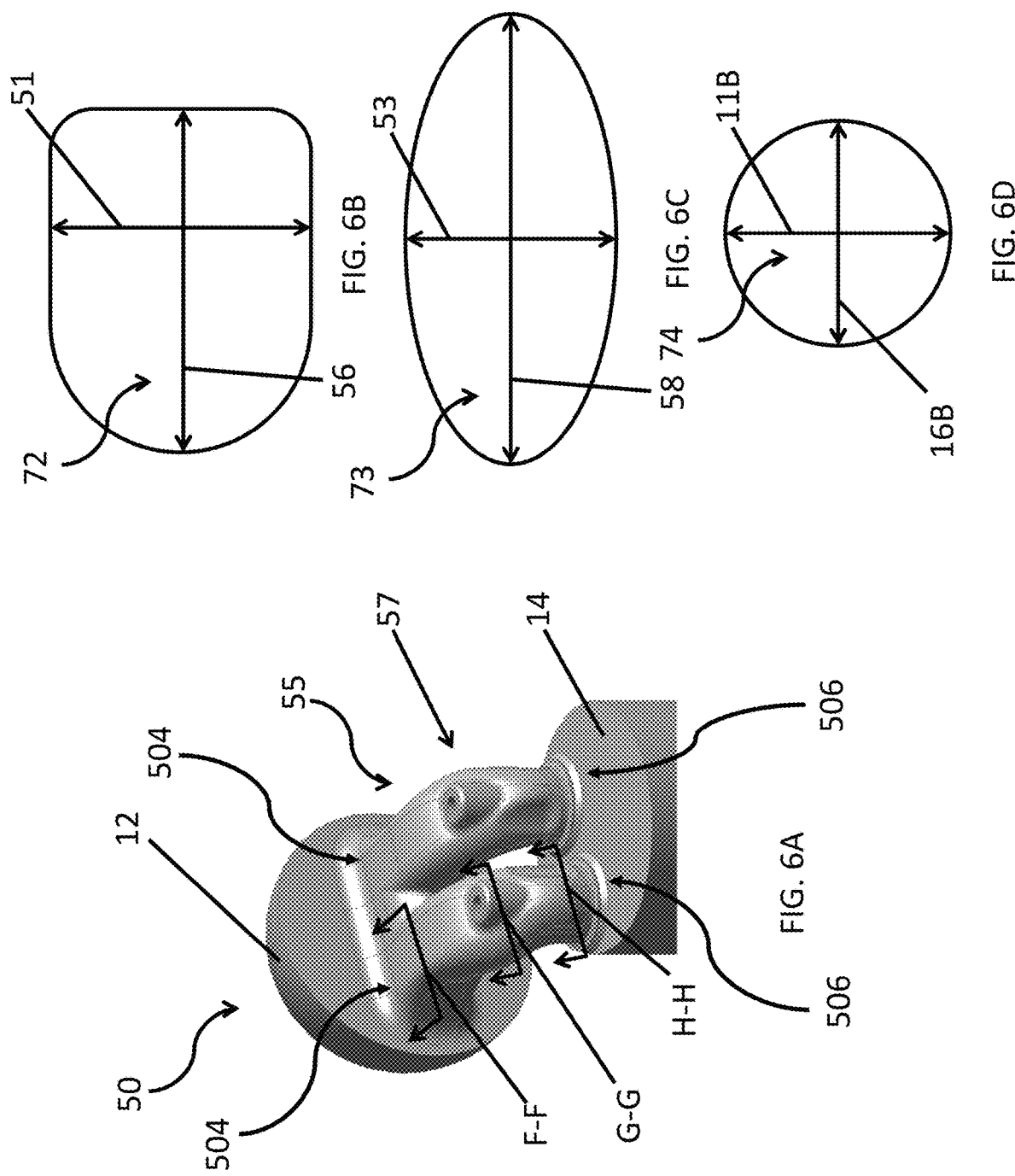

COBRA HEAD AIR INTAKE PORTS AND INTAKE MANIFOLDS

CROSS-REFERENCE TO RELATED APPLICATIONS

The present application is a continuation-in part of U.S. application Ser. No. 16/329,410, filed Feb. 8, 2019, which is a national phase filing of International Application No. PCT/US2016/049787, filed Aug. 31, 2016, the complete disclosures of which are expressly incorporated by reference herein.

FIELD OF THE DISCLOSURE

The present disclosure generally relates to air intake ports and intake manifolds for internal combustion engines and more particularly, to cobra head air intake ports and cobra head intake manifolds coupled to an air inlet connection with improved efficiency.

BACKGROUND OF THE DISCLOSURE

An internal combustion engine includes an engine body and engine components, such as an engine cylinder, intake manifold, and intake port(s). Air intake into the engine cylinder determines, in part, the efficiency of an engine. One goal for an internal combustion engine as it pertains to air intake is to bring in as much air as possible into the engine cylinder for combustion. One challenge with air intake ports and/or intake manifolds is that they may contain a bend and based on the configuration of the bend, the intake ports and/or intake manifolds may be inefficient at bringing the maximum amount of air into the engine cylinder resulting in engine inefficiencies. Improvements in air intake system efficiency are desired.

Referring to FIGS. 3 and 4, an intake portion 30 of an engine is shown. Intake portion 30 includes cooler 32, throttle valve 34, and an elbow section 35 configured to turn and substantially change the direction of air flow entering the inlet. As air enters cooler 32, air moves through throttle valve 34, which serves to regulate the amount of air entering the engine, elbow section 35 and elbow exit plane 36. Air then further proceeds to intake manifold 33, intake runner 38, and engine cylinder 39.

Elbow section 35 has a transition from throttle valve 34 to elbow exit plane 36 and intake manifold 33 in that both the inner and outer surfaces of bend 37 includes a single continuous turn. Elbow section 35 has a single bend 37 and has an increasing diameter throughout elbow section 35 until it reaches elbow exit plane 36 and couples to intake manifold 33.

SUMMARY OF THE DISCLOSURE

The present disclosure provides air intake ports and/or intake manifolds having an altered configuration to improve the efficiency of the air intake ports, intake manifolds, and by extension, the engine.

According to one embodiment, the present disclosure provides an intake port comprising: a tubular member having an inlet and an outlet, the tubular member having a bend positioned between the inlet and the outlet; the tubular member having a first axis length and a second axis length at portions of the tubular member upstream of the bend; the tubular member having a third axis length and a fourth axis length at the bend; and the tubular member having a fifth axis length and a sixth axis length at portions downstream of the bend; and wherein the third axis length is greater than the first axis length and the second axis length is greater than the fourth axis length.

According to another embodiment, the present disclosure provides an air inlet apparatus comprising: an elbow section having an inlet and an outlet, the outlet coupled to an intake manifold; the elbow section including a bend having a first turn near the inlet and a second turn near the outlet, wherein the first turn and the second turn cooperate to change a direction of air flow through the elbow section; a substantially straight section connecting the first turn and the second turn; a first bulge section adjacent to the first turn; and a second bulge section adjacent to the second turn, wherein the first bulge section and the second bulge section are configured to maintain flow uniformity and reduce pressure drop of the air flow.

According to another embodiment, the present disclosure provides an air intake apparatus comprising: a tubular member having an inlet and an outlet, the tubular member having a bend positioned between the inlet and the outlet; the tubular member having a first axis length and a second axis length at portions of the tubular member upstream of the bend; the tubular member having a third axis length and a fourth axis length at the bend; the tubular member having a fifth axis length and a sixth axis length at portions downstream of the bend; wherein the third axis length is greater than the first axis length and the second axis length is greater than the fourth axis length; the tubular member has a first cross-sectional area at a location upstream or downstream of the bend, and a second cross-sectional area at the bend that is substantially equal to the first cross-sectional area; an elbow section having an inlet and an outlet, the outlet of the elbow section coupled to an intake manifold; the elbow section including a bend having a first turn near the inlet of the elbow section and a second turn near the outlet of the elbow section, wherein the first turn and the second turn cooperate to change a direction of air flow through the elbow section; a substantially straight section connecting the first turn and the second turn; a first bulge section adjacent to the first turn; and a second bulge section adjacent to the second turn, wherein the first bulge section and the second bulge section are configured to maintain flow uniformity and reduce pressure drop of the air flow.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 1A is a perspective view of an air intake port according to an embodiment of the present disclosure;

FIG. 1B is a cross-sectional view of the air intake port of FIG. 1A taken along line A-A upstream of a bend in the air intake port;

FIG. 1C is a cross-sectional view of the air intake port of FIG. 1A taken along line B-B at the bend of the air intake port;

FIG. 1D is a cross-section view of the air intake port of FIG. 1A taken along line C-C downstream of the bend in the air intake port;

FIG. 2A is a perspective view of an alternate embodiment of an air intake port according to the present disclosure;

FIG. 2B is a cross-sectional view of the air intake port of FIG. 2A taken along line C-C before a bend in the air intake port;

FIG. 2C is a cross-sectional view of the air intake port of FIG. 2A taken along line D-D at the bend of the air intake port;

FIG. 2D is a cross-sectional view of the air intake port of FIG. 2A taken along line E-E after the bend of the air intake port;

FIG. 6A is a perspective view of an alternate embodiment of an air intake port according to the present disclosure;

FIG. 6B is a cross-section view of the air intake port of FIG. 6A take along line F-F before a bend in the air intake port;

FIG. 6C is a cross-sectional view of the air intake port of FIG. 6A taken along line G-G at the bend of the air intake port;

FIG. 6D is a cross-sectional view of the air intake port of FIG. 6A taken along line H-H after the bend of the air intake port;

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 7A:
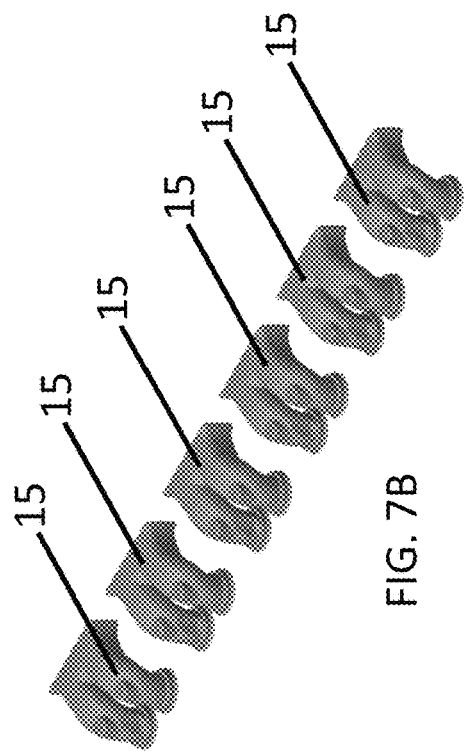
FIG. 7A is a perspective view of an exemplary cylinder head of an internal combustion engine.
Figure 7B:
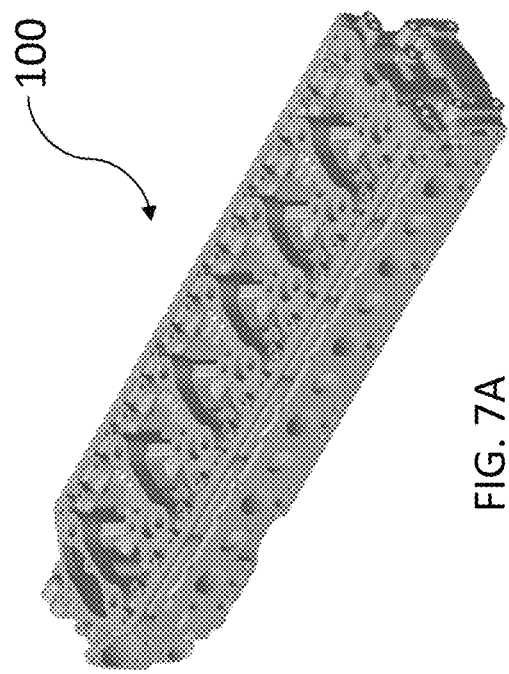
FIG. 7B is a plurality of illustrative air intake ports configured to be cast within the cylinder head of FIG. 7A.
Figure 7C:
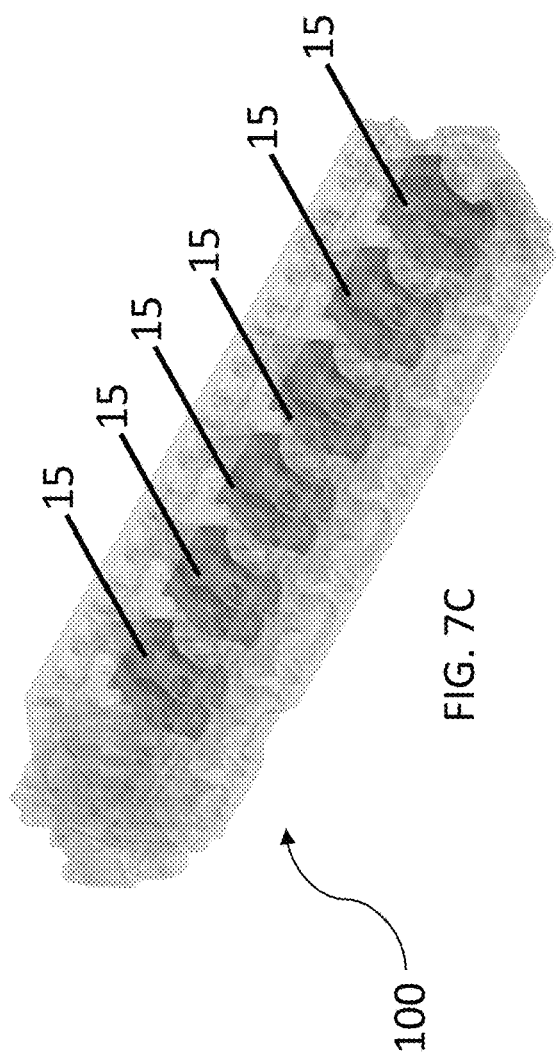
FIG. 7C is a perspective view of the combination of the cylinder head of FIG. 7A and the plurality of illustrative air intake ports of FIG. 7B.

Referring initially to FIG. 7A, a cast engine cylinder head 100 is shown. Cylinder head 100 sits on top of a cylinder block of an engine above the cylinders to facilitate formation of a combustion chamber of an internal combustion engine. The cylinder head 100 further houses intake ports 15, shown in FIG. 7B, which are cast into the cylinder head 100 as shown in FIG. 7C to route charged air to an engine cylinder 14 (FIG. 1A) as discussed further herein.

In FIG. 1A, an intake portion 10 of an engine is shown, the intake portion 10 defining a passage volume 102. As discussed above, intake portion 10 includes intake ports 15, each intake port 15 having an inlet 104 and an outlet 106. In an exemplary embodiment, the inlet 104 is coupled to and in communication with an intake manifold 12, and the outlet 106 is coupled to and in communication with an engine cylinder 14. In the illustrated embodiment, intake port 15 includes a bend 17 between the inlet 104 and the outlet 106. During operation of the engine, air moves from intake manifold 12 into the intake port 15 through the inlet 104, through bend 17, and out of the intake port 15 through the outlet 106 into engine cylinder 14. The air is then routed out of engine cylinder 14 as exhaust after combustion. The engine cylinder 14 and the intake manifold 12 are represented graphically only, and the shape and size of such representation should not limit the appearance or structure of the engine cylinder 14 or the intake manifold 12 as described herein.

In the illustrated embodiment, the cross-section of the intake port 15 between the inlet 104 and the bend 17 is circular as shown in FIG. 1B. The fixed diameter of the circular cross-section can be viewed as including a first axis of symmetry having an axis length 16 and a second axis of symmetry having an axis length 11. At the bend 17, the intake port 15 has a cross-sectional area of an ellipse or ovoid as shown in FIG. 1C, with a first axis of symmetry (i.e., the major axis) having an axis length 18, which is larger than first axis length 16, and a second axis of symmetry (i.e., the minor axis) having an axis length 13, which is smaller than second axis length 11. Between the bend 17 and the outlet 106, the intake port 15 returns to its circular cross-section as shown in FIG. 1D with a first axis length 50 and a second axis length 51. In some embodiments, first axis length 50 of FIG. 1D is substantially equal to first axis length 16. In some embodiments, second axis length 51 may be substantially equal to second axis length 11. In other embodiments, first axis length 50 of FIG. 1D is not substantially equal to first axis length 16. In other embodiments, second axis length 51 of FIG. 1D is not substantially equal to second axis length 11.

In some embodiments, while the axis lengths of the intake port 15 change at certain points of the intake port 15, the cross-sectional area throughout the intake port 15 either remains substantially constant or slightly decreases as the intake port 15 extends to the outlet 106. To maintain the cross-sectional area throughout the intake port 15, first axis lengths 16, 18, 50 of the intake port 15 vary in an inverse relationship with second axis lengths 11, 13, 51 of the intake port 15—as the first axis length of the intake port 15 increases, there is a reduction of the second axis length. At the bend 17, the second axis length 13 is smaller than the second axis length 11 positioned upstream of the bend 17 and the second axis length 51 positioned downstream of the bend 17. Additionally, at the bend 17, the first axis length 18 is larger than the first axis length 16 positioned upstream of the bend 17 and the first axis length 50 positioned downstream of the bend 17. Alternately, the first axis length 18 may be smaller than the first axis length 16 and the first axis length 50, while the second axis length 13 is larger than the second axis length 11 and the second axis length 51. The variations in axis lengths of the intake port 15 result in a "cobra-head" shape at the bend 17.

In other embodiments, the cross-sectional area of the intake port 15 may change in a controlled manner to facilitate low pressure loss and fuel efficiency. In such embodiments, the intake port 15 forms a "cobra-head" shape as described above, but the cross-sectional area is not substantially constant throughout the intake port 15. A first cross-sectional area 52 can be calculated upstream of the bend 17 using the first axis length 16 and the second axis length 11. A second cross-sectional area 53 of the intake port 15 at the bend 17 can be calculated using the first axis length 18 and the second axis length 13. A third cross-sectional area 54 of the intake port 15 can be calculated downstream of the bend 17 using the first axis length 50 and the second axis length 51. In every embodiment, the first cross-sectional area 52 is larger than or equal to the second cross-sectional area 53. Additionally, the third cross-sectional area 54 is larger than or equal to the second cross-sectional area 53.

As air is brought into the system during operation, air moves along the path of least resistance. In the case of an intake port with a bend, air wants to move through the intake port immediately adjacent to the inner or lower surface of the bend because it is the shortest path to the engine cylinder, i.e., the path of least resistance.

As explained above, with the "cobra head" configuration as described in FIGS. 1A-1C, the increased first axis length 18 and the reduced second axis length 13 at thebend 17 result in an elliptical cross-section as compared to a circular cross-section which exists upstream and downstream of the bend 17. By having an elliptical cross-section instead of a circular cross-section, the lower surface of the bend 17 is laterally extended; thereby, increasing the surface area immediately adjacent to the lower surface of the bend 17. With the increased surface area at this location, a greater amount of air can move through the intake port 15 immediately adjacent to the lower surface of the bend 17. Additionally, because the second axis length 13 of the intake port 15 is smaller at the bend 17, a greater portion of the cross-sectional area of the intake port 15 is closer to the lower surface of the bend 17. This permits a greater amount of air per unit area to move through the intake port 15 adjacent to the lower surface of the bend 17 with a lower pressure loss when compared with upper portions of an intake port with a circular cross-section at the bend 17. By having more air move through the intake port 15 and out of the outlet 106, illustratively into the cylinder 14, a more efficient air intake port 15 is provided.

Referring now to FIGS. 2A-2D, an alternate embodiment of an intake portion 20 is shown. Intake portion 20 includes intake ports 25 including an inlet 204 and an outlet 206. In an exemplary embodiment, the inlet 104 is coupled to and in communication with the intake manifold 12, while the outlet 106 is coupled to and in communication with the engine cylinder 14. Like the intake port 15, the intake port 25 includes a bend 27 between the inlet 204 and the outlet 206.

In the illustrated embodiment, between the inlet 104 and the bend 27, intake port 25 has a square cross-section with a first axis length 26 and an equal, second axis length 21 as shown in FIG. 2B. At the bend 27, the intake port 25 has a substantially rectangular cross-section with a first axis length 28 (FIG. 2C), which is larger than the first axis length 26 of the square cross-section portion of the intake port 25, and a second axis length 23, which is smaller than the second axis length 21. In the illustrated embodiment, the rectangular cross section of the intake port 25 has rounded corners. Between the bend 27 and the outlet 106, the intake port 25 returns to a circular cross-section as shown in FIG. 2D with a first axis length 16A, which is smaller than the first axis length 28, and a second axis length 11A, which is larger than the second axis length 23. In one exemplary embodiment, axis lengths 16A, 11A are substantially equal to axis lengths 16, 11 of FIG. 1B. In an alternate embodiment, the axis lengths of the intake port 25 upstream and downstream of the bend 27 are substantially equal to each other. In a further alternate embodiment, the axis lengths of the intake port 25 upstream and downstream of the bend 27 are not substantially equal to each other. The circular cross-section of FIG. 2D and the square cross-section of FIG. 2B are interchangeable in position. In other words, the circular cross-section may be positioned upstream of the bend 27 while the square cross-section may be positioned downstream of the bend 27.

In some embodiments, while the axis lengths of the intake port 25 changes at certain points of the intake port 25, the cross-sectional area throughout the intake port 25 either remains substantially constant or slightly decreases as the intake port 25 extends to the outlet 206. To maintain the cross-sectional area throughout the intake port 25, the first axis lengths 26, 28, 16A of the intake port 25 vary in an inverse relationship with the second axis lengths 21, 23, 11A of the intake port 25—as the first axis length of the intake port 25 increases, there is a reduction of the second axis length. At the bend 27, the second axis length 23 is smaller than the second axis length 21 and the second axis length 11A, which are located at portions of intake port 25 that are either upstream or downstream of the bend 27. Additionally, at the bend 27, the first axis length 28 is larger than the first axis length 26 and the first axis length 16A, which are located at portions of the intake port 25 that are either upstream or downstream of the bend 27. Alternately, the second axis length 23 at the bend 27 may be larger than the second axis length 21 and the second axis length 11A, while the first axis length 28 at the bend 27 may be smaller than the first axis length 26 and the first axis length 16A. The variations in axis lengths of the intake port 25 result in a rectangular "cobra-head" shape at the bend 27.

In other embodiments, the cross-sectional area of the intake port 25 may change in a controlled manner to facilitate low pressure loss and fuel efficiency. In such embodiments, the intake port forms a "cobra-head" shape as described above, but the cross-sectional area is not substantially constant throughout the intake port 25. A first cross-sectional area 62 can be calculated either upstream or downstream of the bend 27 using the corresponding first axis length 26 and the corresponding second axis length 21. A second cross-sectional area 63 of the intake port 25 at the bend 27 can be calculated using the first axis length 28 and the second axis length 23. A third cross-sectional area 64 of the other upstream or downstream of the bend 27 can be calculated using the corresponding first axis length 16A and the corresponding second axis length 11A. In every embodiment, the first cross-sectional area 62 is larger than or equal to the second cross-sectional area 63. Additionally, the third cross-sectional area 64 is larger than or equal to the second cross-sectional area 53.

As mentioned earlier, as air is brought into the system during operation, air wants to move along the path of least resistance. In the case of an intake port with a bend, air wants to move through the intake port adjacent to the inner or lower surface of the bend because it is the shortest path to the engine cylinder, i.e., the path of least resistance. With the "rectangular cobra head" configuration as described in FIGS. 2, 2A, and 2B, the increased first axis length 28 and the reduced second axis length 23 at the bend 27 result in a substantially rectangular cross-section as compared to a square or circular cross-section which exists upstream and/or downstream of the bend 27, respectively. By having a rectangular cross-section instead of a square cross-section, the lower surface of the bend 27 is extended; thereby, increasing the surface area adjacent to the lower surface of the bend 27. With the increased surface area at this location, a greater amount of air can move through the intake port 25 adjacent to the lower surface of the bend 27. Additionally, because the second axis length 23 of the intake port 25 is lower at the bend 27, a greater portion of the cross-sectional area of the intake port 25 is closer to the lower surface of the bend 27. This permits a greater amount of air per unit area to be closer to the bend 27 and move through the intake port 25 adjacent to the lower surface of the bend 27 without experiencing a larger pressure loss as occurs with upper portions of an intake port with a square cross-section at the bend 27. By having more air move the through intake port 25 and out of the outlet 206, i.e. into cylinder 14, a more efficient air intake port 25 is provided.

Another feature of the cobra-head configuration of FIGS. 1A-1C and 2A-2D is that the intake ports 15, 25 are flexible in design. The intake ports 15 and 25 are able to wrap around other parts of the engine if needed due to spatial limitations without sacrificing performance and maintaining or controlling cross-sectional area throughout the intake port. For example, an intake port 55 with a cross-sectional area shape as shown in FIGS. 6A-6D may be necessary when spatial limitations exist within the engine. The intake port 55 has an inlet 504 and an outlet 506. In an exemplary embodiment, the inlet 504 is coupled to and in communication with an intake manifold 12, while the outlet 506 is coupled to and in communication with an engine cylinder 14. The intake port 55 further includes a bend 57 positioned between the inlet 504 and the outlet 506. Additionally, the intake port 55 has a non-symmetrical cross-sectional area (with first axis length 56 and second axis length 51) upstream of the bend 57 as shown in FIG. 6B while having an elliptical cross-section (with a first axis length 58 and a second axis length 53) at the bend 57 and a circular cross-section (with a first axis length 16B and a second axis length 11B) similar to the intake ports 15 and 25 downstream of the bend 57. Like the intake ports 15 and 25, in some embodiments, the intake port 55 substantially maintains its cross-sectional area throughout the entirety of intake port 55.

In other embodiments, the cross-sectional area of the intake port 55 may change in a controlled manner to facilitate low pressure loss and fuel efficiency, wherein the cross-sectional area is not substantially constant throughout the intake port 55. In other words, a first cross-sectional area 72 can be calculated upstream of the bend 57 using the first axis length 56 and the second axis length 51. A second cross-sectional area 73 of the intake port 55 can be calculated using the first axis length 58 and the second axis length 53. A third cross-sectional area 74 of the intake port 55 can be calculated downstream of the bend 57 using the first axis length 16B and the second axis length 11B. In every embodiment, the first cross sectional area 72 is larger than or equal to the second cross-sectional area 73. Additionally, the third cross-sectional area 74 is larger than or equal to the second cross-sectional area 73. Thereby, the intake port 55 still reaps the benefits of the configurations of the intake ports 15 and 25. The intake port 55 may comprise any shape configuration upstream of the bend 57, downstream of the bend 57, or at the bend 57, as long as the other characteristics of the "cobra-head" shape described herein are maintained.

Figures 3, 4:
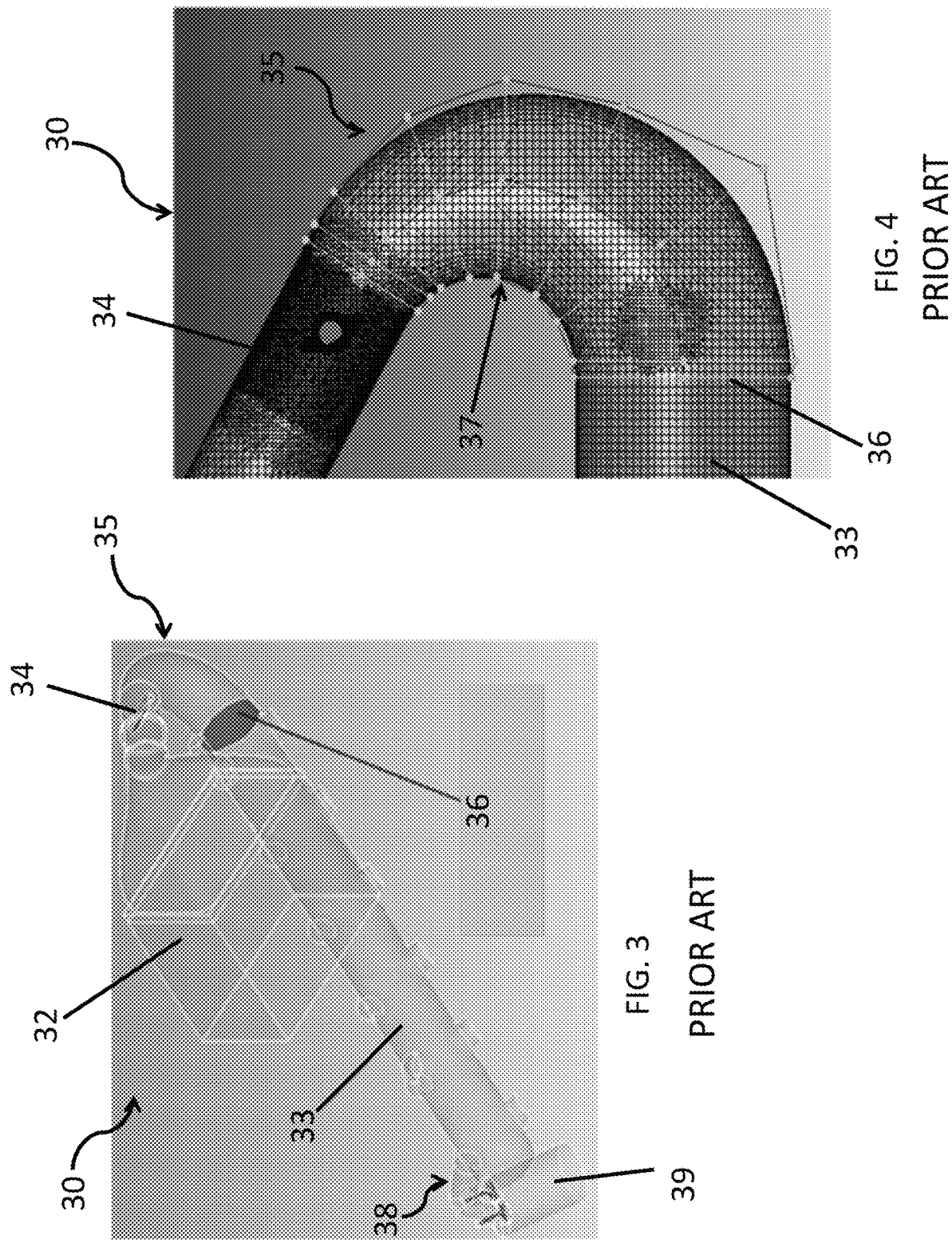
FIG. 3 is a perspective view of an air intake apparatus of an internal combustion engine according to an embodiment of the present disclosure.
FIG. 4 is a side view of a portion of an elbow of the air intake apparatus of FIG. 3.
Figure 5C:
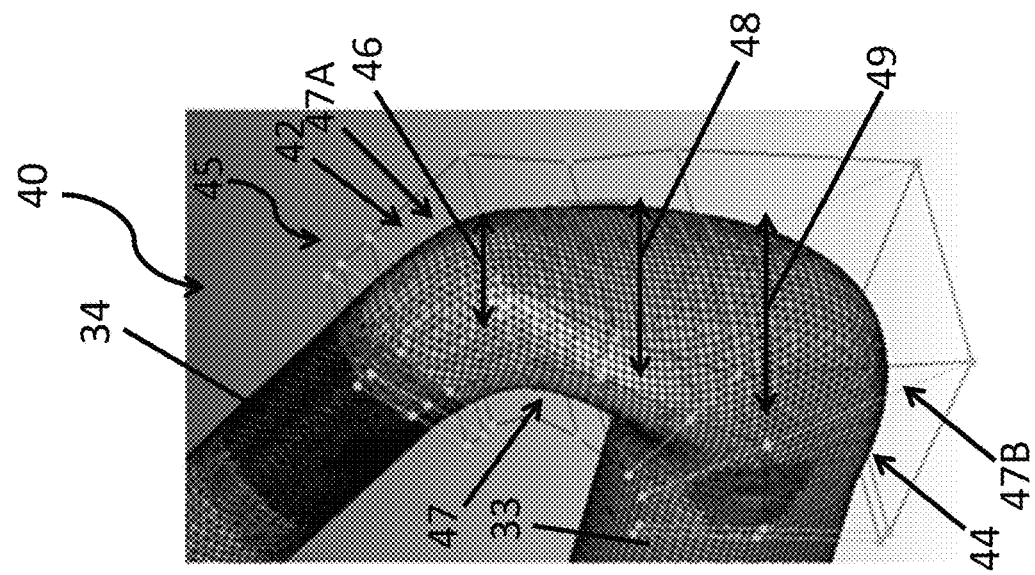
FIG. 5C is a perspective view of the elbow of FIG. 5A.
Figure 5B:
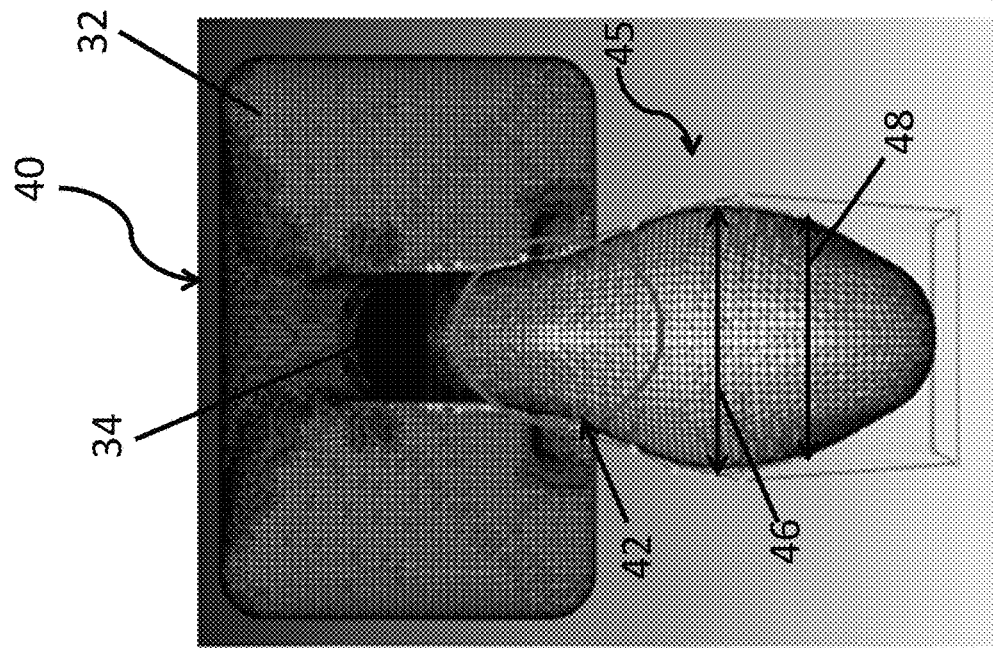
FIG. 5B is a rear view of the elbow of FIG. 5A.
Figure 5A:
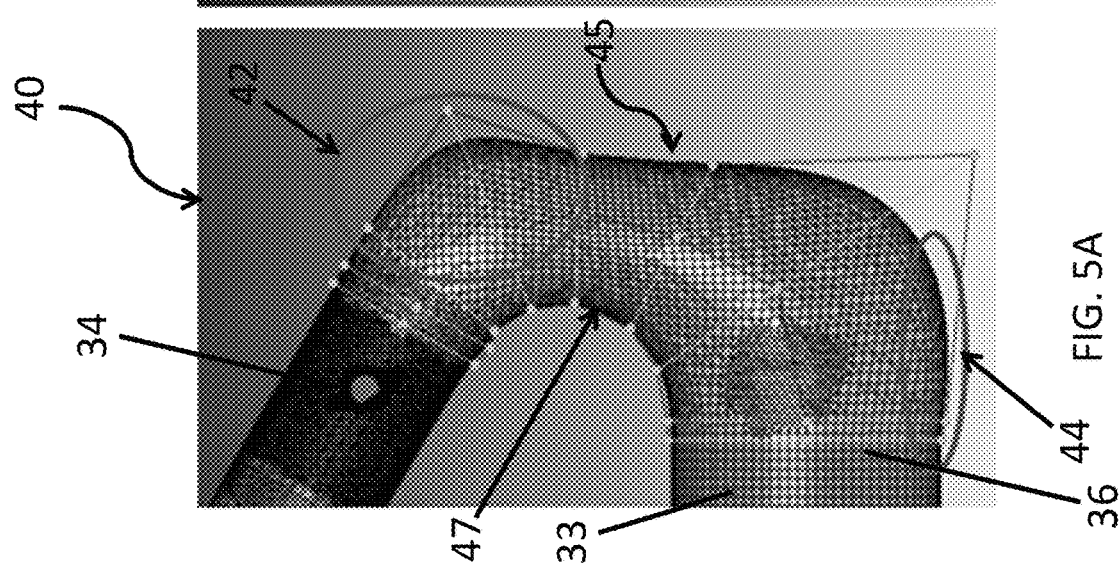
FIG. 5A is a side view of an alternate embodiment of an elbow of the air intake apparatus of FIG. 3 according to the present disclosure.

Referring now to FIGS. 5A-5C, an elbow section 45 for an intake portion 40 of an engine is shown. The intake portion 40 includes a cooler 32, a throttle valve 34, an elbow exit plane 36, and an intake manifold 33. In one exemplary embodiment, the elbow section 45 is coupled to an intake manifold 33. In an alternate embodiment, the elbow section 45 is integrally formed with the intake manifold 33.

The elbow section 45 is configured to turn and substantially change the direction of air flow entering from the cooler 32 while maintaining flow uniformity and reducing fluid pressure drop through an elbow exit plane 36. The elbow section 45 includes a bend 47, and the elbow section 45 includes a "cobra head" configuration along an outer surface of the bend 47, similar to what is shown in FIGS. 1A-1C and 2A-2D. Additionally, the outer surface of the bend 47 includes two distinct turns 47A, 47B with a substantially straight section therebetween due to the cobra-head like configuration and bulges, as described in further detail below.

As air moves from the throttle valve 34 towards the intake manifold 33, air moves through the elbow section 45. In the illustrated embodiment, at the first turn 47A, the elbow section 45 has a substantially circular cross-section with a first axis length 46. As air moves to a substantially straight portion of the bend 47 of the elbow section 45, the elbow section 45 has a substantially elliptical cross-sectional area with a first axis length 48, which is larger than the first axis length 46. As air moves into the second turn 47B, the cross-sectional area of the elbow section 45 returns to a circle with a first axis length 49, which is larger than the first axis length 46. In an alternate embodiment, the axis lengths of the elbow section 45 upstream and downstream of the bend 47 are substantially equal to each other. After the second turn 47B, air moves through the exit plane 36 and into the intake manifold 33.

While the first axis lengths of the elbow section 45 change at certain points along the substantially straight portion of the elbow section 45, the second axis lengths (not shown), which span the distance between the inner and outer surfaces of the bend 47, along the bend 47 either remain substantially constant or become slightly smaller along the substantially straight portion of the elbow section 45. The variations in axis lengths of the elbow section 45 result in a "cobra head" shaped elbow section 45 at the substantially straight portion of the bend 47.

As mentioned earlier, with respect to FIGS. 1A-1C and 2A-2D, the "cobra head" configuration increases the surface area adjacent to the lower surface of the bend 47 so that a greater amount of air can move through the elbow section 45 adjacent to the bend 47. Also, since the height of the elbow section 45 is constant or reduced at the bend 47, a greater portion of the cross-sectional area of the elbow section 45 is closer to the lower surface of the bend 47. This allows a greater amount of air per unit area to move through the elbow 45 adjacent to the bend 47 without experiencing a pressure loss that would occur if the height is increased at the bend 47. By having more air move through the elbow section 45 and into the intake manifold 33, a more efficient elbow is provided.

The elbow section 45 also includes an upper bulge 42 positioned substantially adjacent the throttle valve 34 and a lower bulge 44 positioned adjacent the elbow exit plane 36 and the intake manifold 33. In an alternate embodiment, only an upper bulge 42 may be used. In a further alternate embodiment, only a lower bulge 44 may be used.

The upper bulge 42 and the lower bulge 44 are strategically placed where a majority of air flow is turned within the elbow section 45—at turns 47A, 47B. The bulges 42, 44 provide an increase in area within the elbow section 45 and serve to reduce the speed of air flow through turns 47A, 47B. The reduction in air flow speed allows the air to move through turns 47A, 47B without experiencing a large pressure loss, which improves flow uniformity.

As mentioned earlier, the elbow section 45 is configured to turn and substantially change the direction of air flow entering from the cooler 32 while improving flow uniformity and reducing fluid pressure drop through turns 47A and 47B. Due to the presence of the throttle valve 34 upstream of the elbow section 45, there are two distinct regions of high velocity flow streams —one following the first turn 47A and the other following the substantially straight section leading into the second turn 47B. The high velocity regions contribute to a non-uniform flow distribution at the exit plane 36. The elbow section 45 mitigates the high velocity flow of air after the turn 47A and after the substantially straight section of the elbow section 45 by expanding the second axis lengths at the first turn 47A and the second turn 47B. By diffusing high velocity flow through the elbow section 45, flow uniformity is improved.

The elbow section 45 substantially changes the direction of the inlet flow of air with a lower pressure loss and better flow distribution. The combination of second axis length expansion at turns 47A, 47B and the strategic placement of the bulges 42, 44 at turns 47A, 47B, respectively, result in a higher flow uniformity for inlet air flow. An improvement in flow uniformity reduces the recirculation of charge in the log, which in turn, helps with lowering both pressure drop and cylinder-to-cylinder variation of the non-dimensional swirl number. It also helps reduce the cylinder-to-cylinder combustion variance overall and promotes even breathing of the downstream engine cylinders.

Flow uniformity varies between 0 and 1. A flow uniformity value of 0 at the exit plane 36 means that all the flow is moving away from the exit plane 36 while a flow uniformity value of 1 at the exit plane 36 means that all the flow is moving through the exit plane 36 and normal to the exit plane 36 in the direction of the intake manifold 33. Additionally, with a flow uniformity value of 1, the flow at any point on the plane 36 has the same velocity. In one exemplary embodiment, the average flow uniformity of the intake portion 40 with the upper bulge 42 and the lower bulge 44 is 0.864 and the pressure drop is 17.28 kPa.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. An intake port comprising:
a passage defined by the intake port having an inlet and an outlet, the passage having a bend positioned between the inlet and the outlet;
the passage having a first cross-sectional area of a first cross-section taken at an angle orthogonal to the passage at a first portion of the passage upstream of the bend and downstream of the inlet;
the passage having a second cross-sectional area of a second cross-section taken at an angle orthogonal to the passage at an apex of the bend; and
the passage having a third cross-sectional area of a third cross-section taken at an angle orthogonal to the passage at a second portion of the passage downstream of the bend and upstream of the outlet; and
wherein at least one of the first cross-sectional area and the third cross-sectional area are greater than the second cross-sectional area.

2. The intake port of claim 1, wherein the first cross-sectional area is substantially equal to the second cross-sectional area.

3. The intake port of claim 1, wherein the third cross-sectional area is substantially equal to the second cross-sectional area.

4. The intake port of claim 1, wherein the first cross-sectional area is a circle and the second cross-sectional area is substantially elliptical.

5. The intake port of claim 4, wherein the third cross-sectional area is a circle.

6. The intake port of claim 1, wherein the first cross-sectional area is a square and the second cross-sectional area is substantially rectangular.

7. The intake port of claim 6, wherein the third cross-sectional area is a circle.

8. The intake port of claim 1, wherein at least one of the first cross-sectional area, the second cross-sectional area, and the third cross-sectional area each comprise non-symmetrical shape.

9. The intake port of claim 1, wherein both the first cross-sectional area and the third cross-sectional area are larger than the second cross-sectional area.

10. The intake port of claim 1, wherein each of the first cross-sectional area, the second cross-sectional area, and the third cross-sectional areas are different from each other.

11. The intake port of claim 1, wherein the first cross-sectional area and the third cross-sectional area are substantially the same.

12. An intake port comprising:
a passage defined by the intake port having an inlet and an outlet, the passage having a bend positioned between the inlet and the outlet;
the passage having a first cross-sectional area of a first cross-section taken at an angle orthogonal to the passage at a first portion of the passage upstream of the bend and downstream of the inlet, the first cross-sectional area defined by a first axis defining a first length and a second axis defining a second length, wherein the first axis is substantially perpendicular to the second axis;
the passage having a second cross-sectional area of a second cross-section taken at an orthogonal to the passage at an apex of the bend, the second cross-sectional area defined by a third axis defining a third length and a fourth axis defining a fourth length, wherein the third axis is substantially perpendicular to the fourth axis; and
the passage having a third cross-sectional area of a third cross-section taken at an angle orthogonal to the passage at a second portion of the passag downstream of the bend and upstream of the outlet, the third cross-sectional area defined by a fifth axis defining a fifth length and a sixth axis defining a sixth length, wherein the fifth axis is substantially perpendicular to the sixth axis; and
wherein the third length is shorter than all of the first length, the fourth length, and the fifth length and the fourth length is longer than all of the second length, the third length and the sixth length.

13. The intake port of claim 12, wherein the first length is substantially equal to the second length.

14. The intake port of claim 12, wherein the fifth length is substantially equal to the sixth length.

15. The intake port of claim 12, wherein the first cross-sectional area, the second cross-sectional area, and the third cross-sectional area are all substantially equal.

16. The intake port of claim 12, wherein at least one of the first cross-sectional area and the third cross-sectional area are greater than the second cross-sectional area.

17. An intake port, comprising:
an internal surface defined by a passage of the intake port, the passage having an inlet and an outlet and a bend positioned between the inlet and the outlet;
the internal surface having a first perimeter surface area defined by a first internal perimeter at a first portion of the passage upstream of the bend and downstream of the inlet along a first length of the first portion;

the internal surface having a second perimeter surface area defined by a second internal perimeter at a second portion of the bend along the first length of the second portion; and the internal surface having a third perimeter surface area defined by a third internal perimeter at a third portion of the passage downstream of the bend and upstream of the outlet along the first length of the third portion; and wherein the second perimeter surface area is greater than both of the first perimeter surface area and the third perimeter surface area.

18. The intake port of claim 17, the passage further comprising a first cross-sectional area at portions of the passage upstream of the bend; a second cross-sectional area at the bend; and a third cross-sectional area at portions of the passage downstream of the bend;

wherein one of the first cross-sectional area and the third cross-sectional area is greater than the second cross-sectional area.

19. The intake port of claim 18, wherein the other of the first cross-sectional area and the third cross-sectional area is substantially equal to the second cross-sectional area.

20. The intake port of claim 17, the passage further comprising a first cross-sectional area at portions of the passage upstream of the bend; a second cross-sectional area at the bend; and a third cross-sectional area at portions of the passage downstream of the bend; wherein the first cross-sectional area, the second cross-sectional area, and the third cross-sectional area are substantially equal.

21. An intake port comprising:

a passage defined by the intake port having an inlet and an outlet, the passage having a bend positioned between the inlet and the outlet;

the passage having a first cross-sectional area at portions of the passage upstream of the bend;

the passage having a second cross-sectional area at the bend; and the passage having a third cross-sectional area at portions downstream of the bend; and wherein at least one of the first cross-sectional area and the third cross-sectional area are greater than the second cross-sectional area; and wherein the first cross-sectional area is a square and the second cross-sectional area is substantially rectangular.

22. An intake port comprising:

a passage defined by the intake port having an inlet and an outlet, the passage having a bend positioned between the inlet and the outlet;

the passage having a first cross-sectional area at portions of the passage upstream of the bend, the first cross-sectional area defined by a first axis defining a first length and a second axis defining a second length, wherein the first axis is substantially perpendicular to the second axis;

the passage having a second cross=sectional area at the bend, the second cross-sectional area defined by a third axis defining a third length and a fourth axis defining a fourth length, wherein the third axis is substantially perpendicular to the fourth axis; and the passage having a third cross-sectional area at portions down stream of the bend, the third cross-sectional area defined by a fifth axis defining a fifth length and a sixth axis defining a sixth length, wherein the fifth axis is substantially perpendicular to the sixth axis; and wherein the third length is shorter than all of the first length, the fourth length, and the fifth length, the fourth length is longer than all of the second length, the third length, and the sixth length, and the fifth length is substantially equal to the sixth length.

23. An intake port comprising:

a passage defined by the intake port having an inlet and an outlet, the passage having a bend positioned between the inlet and the outlet;

the passage having a first cross-sectional area at portions of the passage upstream of the bend, the first cross-sectional area defined by a first axis defining a first length and a second axis defining a second length, wherein the first axis is substantially perpendicular to the second axis;

the passage having a second cross=sectional area at the bend, the second cross-sectional area defined by a third axis defining a third length and a fourth axis defining a fourth length, wherein the third axis is substantially perpendicular to the fourth axis; and the passage having a third cross-sectional area at portions down stream of the bend, the third cross-sectional area defined by a fifth axis defining a fifth length and a sixth axis defining a sixth length, wherein the fifth axis is substantially perpendicular to the sixth axis; and wherein the third length is shorter than all of the first length, the fourth length, and the fifth length, the fourth length is longer than all of the second length, the third length, and the sixth length, and the first cross-sectional area, the second cross-sectional area, and the third cross-sectional area are all substantially equal.

24. An intake port comprising:

a passage defined by the intake port having an inlet and an outlet, the passage having a bend positioned between the inlet and the outlet;

the passage having a first cross-sectional area at portions of the passage upstream of the bend, the first cross-sectional area defined by a first axis defining a first length and a second axis defining a second length, wherein the first axis is substantially perpendicular to the second axis;

the passage having a second cross=sectional area at the bend, the second cross-sectional area defined by a third axis defining a third length and a fourth axis defining a fourth length, wherein the third axis is substantially perpendicular to the fourth axis; and the passage having a third cross-sectional area at portions down stream of the bend, the third cross-sectional area defined by a fifth axis defining a fifth length and a sixth axis defining a sixth length, wherein the fifth axis is substantially perpendicular to the sixth axis; and wherein the third length is shorter than all of the first length, the fourth length, and the fifth length, the fourth length is longer than all of the second length, the third length, and the sixth length, and at least one of the first cross-sectional area and the third cross-sectional area are greater than the second cross-sectional area.

* * * * *